US008214859B2

(12) United States Patent
Kortum et al.

(10) Patent No.: US 8,214,859 B2
(45) Date of Patent: Jul. 3, 2012

(54) AUTOMATIC SWITCHING BETWEEN HIGH DEFINITION AND STANDARD DEFINITION IP TELEVISION SIGNALS

(75) Inventors: Philip Ted Kortum, Austin, TX (US); Marc Andrew Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1216 days.

(21) Appl. No.: 11/057,859

(22) Filed: Feb. 14, 2005

(65) Prior Publication Data

US 2006/0184992 A1   Aug. 17, 2006

(51) Int. Cl.
G06F 3/00      (2006.01)
G06F 13/00     (2006.01)
H04N 5/455     (2006.01)

(52) U.S. Cl. ............ 725/38; 725/39; 725/45; 725/48; 725/52; 725/54; 725/56; 725/57; 725/68; 725/85; 725/100; 348/554; 348/555; 348/556; 348/558

(58) Field of Classification Search ............ 725/86–104, 725/68, 117, 129, 131, 38–39, 45, 48, 52, 725/54, 56–57, 58–61, 110, 139, 151; 348/554–556, 348/558; 345/327, 731
See application file for complete search history.

(56) References Cited

U.S. PATENT DOCUMENTS

| 4,243,147 A | 1/1981 | Twitchell et al. |
| 4,356,509 A | 10/1982 | Skerlos et al. |
| 4,768,926 A | 9/1988 | Gilbert, Jr. |
| 4,907,079 A | 3/1990 | Turner et al. |
| 5,126,731 A | 6/1992 | Cromer, Jr. et al. |
| 5,163,340 A | 11/1992 | Bender |
| 5,475,835 A | 12/1995 | Hickey |
| 5,532,748 A | 7/1996 | Naimpally |
| 5,541,917 A | 7/1996 | Farris |
| 5,583,561 A * | 12/1996 | Baker et al. ............ 725/93 |
| 5,589,892 A | 12/1996 | Knee et al. |

(Continued)

FOREIGN PATENT DOCUMENTS

WO    WO 00/28689 A2    5/2000

(Continued)

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner* — Pankaj Kumar
*Assistant Examiner* — Alazar Tilahun
(74) *Attorney, Agent, or Firm* — Toler Law Group, PC

(57) ABSTRACT

A user interface receives a user selection of a video content item. The video content item is available in a high definition (HD) format and a non-HD format via a broadband network access line. A format selector automatically selects which format of the video content item from the HD format and the non-HD format to retrieve via the broadband network access line. The format is automatically selected based on at least one rule. A receiver receives the video content item via the broadband network access line in the format automatically selected by the format selector. A television display displays the video content item received by the receiver and in the format automatically selected by the format selector.

19 Claims, 1 Drawing Sheet

U.S. PATENT DOCUMENTS

| | | | |
|---|---|---|---|
| 5,592,477 | A | 1/1997 | Farris et al. |
| 5,610,916 | A | 3/1997 | Kostreski et al. |
| 5,613,012 | A | 3/1997 | Hoffman et al. |
| 5,650,831 | A | 7/1997 | Farwell |
| 5,651,332 | A | 7/1997 | Moore et al. |
| 5,656,898 | A | 8/1997 | Kalina |
| 5,675,390 | A | 10/1997 | Schindler et al. |
| 5,708,961 | A | 1/1998 | Hylton et al. |
| 5,722,041 | A | 2/1998 | Freadman |
| 5,724,106 | A | 3/1998 | Autry et al. |
| 5,729,825 | A | 3/1998 | Kostreski et al. |
| 5,734,853 | A * | 3/1998 | Hendricks et al. ............ 715/716 |
| 5,774,357 | A | 6/1998 | Hoffberg et al. |
| 5,793,438 | A | 8/1998 | Bedard |
| 5,805,719 | A | 9/1998 | Pare, Jr. et al. |
| 5,818,438 | A | 10/1998 | Howe et al. |
| 5,838,384 | A | 11/1998 | Schindler et al. |
| 5,838,812 | A | 11/1998 | Pare, Jr. et al. |
| 5,864,757 | A | 1/1999 | Parker |
| 5,867,223 | A | 2/1999 | Schindler et al. |
| 5,892,508 | A | 4/1999 | Howe et al. |
| 5,900,867 | A | 5/1999 | Schindler et al. |
| 5,910,970 | A | 6/1999 | Lu |
| 5,933,498 | A | 8/1999 | Schneck et al. |
| 5,953,318 | A | 9/1999 | Nattkemper et al. |
| 5,956,024 | A | 9/1999 | Strickland et al. |
| 5,956,716 | A | 9/1999 | Kenner et al. |
| 5,970,088 | A | 10/1999 | Chen |
| 5,987,061 | A | 11/1999 | Chen |
| 5,990,927 | A * | 11/1999 | Hendricks et al. ............ 725/132 |
| 5,995,155 | A | 11/1999 | Schindler et al. |
| 5,999,518 | A | 12/1999 | Nattkemper et al. |
| 5,999,563 | A | 12/1999 | Polley et al. |
| 6,002,722 | A | 12/1999 | Wu |
| 6,014,184 | A | 1/2000 | Knee et al. |
| 6,021,158 | A | 2/2000 | Schurr et al. |
| 6,021,167 | A | 2/2000 | Wu |
| 6,028,600 | A | 2/2000 | Rosin et al. |
| 6,029,045 | A | 2/2000 | Picco et al. |
| 6,038,251 | A | 3/2000 | Chen |
| 6,044,107 | A | 3/2000 | Gatherer et al. |
| 6,052,120 | A | 4/2000 | Nahi et al. |
| 6,055,268 | A | 4/2000 | Timm et al. |
| 6,072,483 | A | 6/2000 | Rosin et al. |
| 6,084,584 | A | 7/2000 | Nahi et al. |
| 6,111,582 | A | 8/2000 | Jenkins |
| 6,118,498 | A | 9/2000 | Reitmeier |
| 6,122,660 | A | 9/2000 | Baransky et al. |
| 6,124,799 | A | 9/2000 | Parker |
| 6,133,910 | A * | 10/2000 | Stinebruner .................... 725/49 |
| 6,137,839 | A | 10/2000 | Mannering et al. |
| 6,166,734 | A | 12/2000 | Nahi et al. |
| 6,181,335 | B1 | 1/2001 | Hendricks et al. |
| 6,192,282 | B1 | 2/2001 | Smith et al. |
| 6,195,692 | B1 | 2/2001 | Hsu |
| 6,215,483 | B1 | 4/2001 | Zigmond |
| 6,222,308 | B1 * | 4/2001 | Ozawa et al. ............. 313/346 R |
| 6,237,022 | B1 | 5/2001 | Bruck et al. |
| 6,243,366 | B1 | 6/2001 | Bradley et al. |
| 6,252,588 | B1 | 6/2001 | Dawson |
| 6,252,989 | B1 | 6/2001 | Geisler et al. |
| 6,260,192 | B1 | 7/2001 | Rosin et al. |
| 6,269,394 | B1 | 7/2001 | Kenner et al. |
| 6,275,268 | B1 | 8/2001 | Ellis et al. |
| 6,275,989 | B1 | 8/2001 | Broadwin et al. |
| 6,281,813 | B1 | 8/2001 | Vierthaler et al. |
| 6,286,142 | B1 | 9/2001 | Ehreth |
| 6,295,057 | B1 | 9/2001 | Rosin et al. |
| 6,311,214 | B1 | 10/2001 | Rhoads |
| 6,314,409 | B2 | 11/2001 | Schneck et al. |
| 6,327,000 | B1 * | 12/2001 | Auld et al. .................... 348/441 |
| 6,344,882 | B1 | 2/2002 | Shim et al. |
| 6,357,043 | B1 | 3/2002 | Ellis et al. |
| 6,359,636 | B1 | 3/2002 | Schindler et al. |
| 6,363,149 | B1 | 3/2002 | Candelore |
| 6,449,601 | B1 | 9/2002 | Friedland et al. |
| 6,460,075 | B2 | 10/2002 | Krueger et al. |
| 6,470,378 | B1 | 10/2002 | Tracton et al. |
| 6,481,011 | B1 | 11/2002 | Lemmons |
| 6,486,892 | B1 | 11/2002 | Stern |
| 6,492,913 | B2 | 12/2002 | Vierthaler et al. |
| 6,519,011 | B1 | 2/2003 | Shendar |
| 6,529,949 | B1 | 3/2003 | Getsin et al. |
| 6,535,590 | B2 | 3/2003 | Tidwell et al. |
| 6,538,704 | B1 | 3/2003 | Grabb et al. |
| 6,542,740 | B1 | 4/2003 | Olgaard et al. |
| 6,557,030 | B1 | 4/2003 | Hoang |
| 6,567,982 | B1 | 5/2003 | Howe et al. |
| 6,587,873 | B1 | 7/2003 | Nobakht et al. |
| 6,598,231 | B1 | 7/2003 | Basawapatna et al. |
| 6,599,199 | B1 | 7/2003 | Hapshie |
| 6,607,136 | B1 | 8/2003 | Atsmon et al. |
| 6,609,253 | B1 | 8/2003 | Swix et al. |
| 6,611,537 | B1 | 8/2003 | Edens et al. |
| 6,614,987 | B1 | 9/2003 | Ismail et al. |
| 6,622,148 | B1 | 9/2003 | Noble et al. |
| 6,622,307 | B1 | 9/2003 | Ho |
| 6,622,308 | B1 * | 9/2003 | Raiser .......................... 725/151 |
| 6,631,523 | B1 | 10/2003 | Matthews, III et al. |
| 6,640,239 | B1 | 10/2003 | Gidwani |
| 6,643,495 | B1 | 11/2003 | Gallery et al. |
| 6,643,684 | B1 | 11/2003 | Malkin et al. |
| 6,650,761 | B1 | 11/2003 | Rodriguez et al. |
| 6,658,568 | B1 | 12/2003 | Ginter et al. |
| 6,671,732 | B1 | 12/2003 | Weiner |
| 6,678,215 | B1 | 1/2004 | Treyz et al. |
| 6,678,733 | B1 | 1/2004 | Brown et al. |
| 6,690,392 | B1 | 2/2004 | Wugoski |
| 6,693,236 | B1 | 2/2004 | Gould et al. |
| 6,700,624 | B2 * | 3/2004 | Yun .............................. 348/555 |
| 6,701,523 | B1 | 3/2004 | Hancock et al. |
| 6,704,931 | B1 | 3/2004 | Schaffer et al. |
| 6,714,264 | B1 | 3/2004 | Kempisty |
| 6,725,281 | B1 | 4/2004 | Zintel et al. |
| 6,731,393 | B1 | 5/2004 | Currans et al. |
| 6,732,179 | B1 | 5/2004 | Brown et al. |
| 6,745,223 | B1 | 6/2004 | Nobakht et al. |
| 6,745,392 | B1 | 6/2004 | Basawapatna et al. |
| 6,754,206 | B1 | 6/2004 | Nattkemper et al. |
| 6,756,997 | B1 | 6/2004 | Ward, III et al. |
| 6,760,918 | B2 | 7/2004 | Rodriguez et al. |
| 6,763,226 | B1 | 7/2004 | McZeal, Jr. |
| 6,765,557 | B1 | 7/2004 | Segal et al. |
| 6,766,305 | B1 | 7/2004 | Fucarile et al. |
| 6,769,128 | B1 | 7/2004 | Knee et al. |
| 6,771,317 | B2 | 8/2004 | Ellis et al. |
| 6,773,344 | B1 | 8/2004 | Gabai et al. |
| 6,778,559 | B2 | 8/2004 | Hyakutake |
| 6,779,004 | B1 | 8/2004 | Zintel |
| 6,781,518 | B1 | 8/2004 | Hayes et al. |
| 6,784,804 | B1 | 8/2004 | Hayes et al. |
| 6,785,716 | B1 | 8/2004 | Nobakht |
| 6,788,709 | B1 | 9/2004 | Hyakutake |
| 6,804,824 | B1 | 10/2004 | Potrebic et al. |
| 6,826,775 | B1 | 11/2004 | Howe et al. |
| 6,826,776 | B1 | 11/2004 | Takano et al. |
| 6,828,993 | B1 | 12/2004 | Hendricks et al. |
| 6,898,800 | B2 * | 5/2005 | Son et al. ........................ 725/93 |
| 6,909,874 | B2 | 6/2005 | Holtz et al. |
| 6,938,021 | B2 | 8/2005 | Shear et al. |
| 7,003,791 | B2 | 2/2006 | Mizutani |
| 7,028,323 | B2 | 4/2006 | Franken et al. |
| 7,054,774 | B2 | 5/2006 | Batterberry et al. |
| 7,069,573 | B1 | 6/2006 | Brooks et al. |
| 7,185,355 | B1 * | 2/2007 | Ellis et al. ........................ 725/46 |
| 7,207,055 | B1 * | 4/2007 | Hendricks et al. .............. 725/95 |
| 7,363,646 | B2 * | 4/2008 | White et al. .................... 725/88 |
| 2001/0011261 | A1 | 8/2001 | Mullen-Schultz |
| 2001/0016945 | A1 | 8/2001 | Inoue |
| 2001/0016946 | A1 | 8/2001 | Inoue |
| 2001/0034664 | A1 | 10/2001 | Brunson |
| 2001/0044794 | A1 | 11/2001 | Nasr et al. |
| 2001/0048677 | A1 | 12/2001 | Boys |
| 2001/0049826 | A1 | 12/2001 | Wilf |
| 2001/0054008 | A1 | 12/2001 | Miller et al. |
| 2001/0054009 | A1 | 12/2001 | Miller et al. |
| 2001/0054067 | A1 | 12/2001 | Miller et al. |

| | | | | | | |
|---|---|---|---|---|---|---|
| 2001/0056350 | A1 | 12/2001 | Calderone et al. | 2003/0100340 A1 | 5/2003 | Cupps et al. |
| 2002/0001303 | A1 | 1/2002 | Boys | 2003/0110161 A1 | 6/2003 | Schneider |
| 2002/0001310 | A1 | 1/2002 | Mai et al. | 2003/0110503 A1 | 6/2003 | Perkes |
| 2002/0002496 | A1 | 1/2002 | Miller et al. | 2003/0126136 A1 | 7/2003 | Omoigui |
| 2002/0003166 | A1 | 1/2002 | Miller et al. | 2003/0135771 A1 | 7/2003 | Cupps et al. |
| 2002/0007307 | A1 | 1/2002 | Miller et al. | 2003/0141987 A1 | 7/2003 | Hayes |
| 2002/0007313 | A1 | 1/2002 | Mai et al. | 2003/0145321 A1 | 7/2003 | Bates et al. |
| 2002/0007485 | A1 | 1/2002 | Rodriguez et al. | 2003/0149989 A1 | 8/2003 | Hunter et al. |
| 2002/0010639 | A1 | 1/2002 | Howey et al. | 2003/0153353 A1 | 8/2003 | Cupps et al. |
| 2002/0010745 | A1 | 1/2002 | Schneider | 2003/0153354 A1 | 8/2003 | Cupps et al. |
| 2002/0010935 | A1 | 1/2002 | Sitnik | 2003/0156218 A1* | 8/2003 | Laksono .................... 348/388.1 |
| 2002/0016736 | A1 | 2/2002 | Cannon et al. | 2003/0159026 A1 | 8/2003 | Cupps et al. |
| 2002/0022963 | A1 | 2/2002 | Miller et al. | 2003/0160830 A1 | 8/2003 | DeGross |
| 2002/0022970 | A1 | 2/2002 | Noll et al. | 2003/0163601 A1 | 8/2003 | Cupps et al. |
| 2002/0022992 | A1 | 2/2002 | Miller et al. | 2003/0163666 A1 | 8/2003 | Cupps et al. |
| 2002/0022993 | A1 | 2/2002 | Miller et al. | 2003/0172380 A1 | 9/2003 | Kikinis |
| 2002/0022994 | A1 | 2/2002 | Miller et al. | 2003/0182237 A1 | 9/2003 | Costa et al. |
| 2002/0022995 | A1 | 2/2002 | Miller et al. | 2003/0182420 A1 | 9/2003 | Jones et al. |
| 2002/0023959 | A1 | 2/2002 | Miller et al. | 2003/0185232 A1 | 10/2003 | Moore et al. |
| 2002/0026357 | A1 | 2/2002 | Miller et al. | 2003/0187641 A1 | 10/2003 | Moore et al. |
| 2002/0026358 | A1 | 2/2002 | Miller et al. | 2003/0187646 A1 | 10/2003 | Smyers et al. |
| 2002/0026369 | A1 | 2/2002 | Miller et al. | 2003/0187800 A1 | 10/2003 | Moore et al. |
| 2002/0026475 | A1 | 2/2002 | Marmor | 2003/0189509 A1 | 10/2003 | Hayes et al. |
| 2002/0029181 | A1 | 3/2002 | Miller et al. | 2003/0189589 A1 | 10/2003 | LeBlanc et al. |
| 2002/0030105 | A1 | 3/2002 | Miller et al. | 2003/0194141 A1 | 10/2003 | Kortum et al. |
| 2002/0032603 | A1 | 3/2002 | Yeiser | 2003/0194142 A1 | 10/2003 | Kortum et al. |
| 2002/0035404 | A1 | 3/2002 | Ficco et al. | 2003/0208396 A1 | 11/2003 | Miller et al. |
| 2002/0040475 | A1 | 4/2002 | Yap et al. | 2003/0208758 A1 | 11/2003 | Schein et al. |
| 2002/0042915 | A1 | 4/2002 | Kubischta et al. | 2003/0226044 A1 | 12/2003 | Cupps et al. |
| 2002/0046093 | A1 | 4/2002 | Miller et al. | 2003/0226145 A1 | 12/2003 | Marsh |
| 2002/0049635 | A1 | 4/2002 | Mai et al. | 2003/0229900 A1 | 12/2003 | Reisman |
| 2002/0054087 | A1 | 5/2002 | Noll et al. | 2004/0003041 A1 | 1/2004 | Moore et al. |
| 2002/0054750 | A1 | 5/2002 | Ficco et al. | 2004/0003403 A1 | 1/2004 | Marsh |
| 2002/0059163 | A1 | 5/2002 | Smith | 2004/0006769 A1 | 1/2004 | Ansari et al. |
| 2002/0059425 | A1 | 5/2002 | Belfiore et al. | 2004/0006772 A1* | 1/2004 | Ansari et al. .................... 725/120 |
| 2002/0059599 | A1 | 5/2002 | Schein et al. | 2004/0010602 A1 | 1/2004 | Van Vleck et al. |
| 2002/0065717 | A1 | 5/2002 | Miller et al. | 2004/0015997 A1 | 1/2004 | Ansari et al. |
| 2002/0067438 | A1 | 6/2002 | Baldock | 2004/0030750 A1 | 2/2004 | Moore et al. |
| 2002/0069220 | A1 | 6/2002 | Tran | 2004/0031058 A1 | 2/2004 | Reisman |
| 2002/0069282 | A1 | 6/2002 | Reisman | 2004/0031856 A1 | 2/2004 | Atsmon et al. |
| 2002/0069294 | A1 | 6/2002 | Herkersdorf et al. | 2004/0034877 A1 | 2/2004 | Nogues |
| 2002/0072970 | A1 | 6/2002 | Miller et al. | 2004/0049728 A1 | 3/2004 | Langford |
| 2002/0078442 | A1 | 6/2002 | Reyes et al. | 2004/0064351 A1 | 4/2004 | Mikurak |
| 2002/0097261 | A1 | 7/2002 | Gottfurcht et al. | 2004/0068740 A1 | 4/2004 | Fukuda et al. |
| 2002/0106119 | A1 | 8/2002 | Foran et al. | 2004/0068753 A1 | 4/2004 | Robertson et al. |
| 2002/0112239 | A1 | 8/2002 | Goldman | 2004/0070491 A1 | 4/2004 | Huang et al. |
| 2002/0116392 | A1 | 8/2002 | McGrath et al. | 2004/0073918 A1 | 4/2004 | Ferman et al. |
| 2002/0124055 | A1 | 9/2002 | Reisman | 2004/0098571 A1 | 5/2004 | Falcon |
| 2002/0128061 | A1 | 9/2002 | Blanco | 2004/0107125 A1 | 6/2004 | Guheen et al. |
| 2002/0129094 | A1 | 9/2002 | Reisman | 2004/0107439 A1 | 6/2004 | Hassell et al. |
| 2002/0133402 | A1 | 9/2002 | Faber et al. | 2004/0111745 A1 | 6/2004 | Schein et al. |
| 2002/0138837 | A1* | 9/2002 | Fries et al. ........................ 725/55 | 2004/0111756 A1 | 6/2004 | Stuckman et al. |
| 2002/0138840 | A1 | 9/2002 | Schein et al. | 2004/0117813 A1 | 6/2004 | Karaoguz et al. |
| 2002/0152264 | A1 | 10/2002 | Yamasaki | 2004/0117824 A1 | 6/2004 | Karaoguz et al. |
| 2002/0169611 | A1 | 11/2002 | Guerra et al. | 2004/0128342 A1 | 7/2004 | Maes et al. |
| 2002/0170063 | A1 | 11/2002 | Ansari et al. | 2004/0139173 A1 | 7/2004 | Karaoguz et al. |
| 2002/0173344 | A1 | 11/2002 | Cupps et al. | 2004/0143600 A1 | 7/2004 | Musgrove et al. |
| 2002/0188955 | A1 | 12/2002 | Thompson et al. | 2004/0143652 A1 | 7/2004 | Grannan et al. |
| 2002/0193997 | A1 | 12/2002 | Fitzpatrick et al. | 2004/0148408 A1 | 7/2004 | Nadarajah |
| 2002/0194601 | A1 | 12/2002 | Perkes et al. | 2004/0150676 A1 | 8/2004 | Gottfurcht et al. |
| 2002/0198874 | A1 | 12/2002 | Nasr et al. | 2004/0150748 A1 | 8/2004 | Phillips et al. |
| 2003/0005445 | A1 | 1/2003 | Schein et al. | 2004/0183839 A1 | 9/2004 | Gottfurcht et al. |
| 2003/0009771 | A1 | 1/2003 | Chang | 2004/0194136 A1 | 9/2004 | Finseth et al. |
| 2003/0012365 | A1 | 1/2003 | Goodman | 2004/0198386 A1 | 10/2004 | Dupray |
| 2003/0014750 | A1 | 1/2003 | Kamen | 2004/0201600 A1 | 10/2004 | Kakivaya et al. |
| 2003/0018975 | A1 | 1/2003 | Stone | 2004/0210633 A1 | 10/2004 | Brown et al. |
| 2003/0023435 | A1 | 1/2003 | Josephson | 2004/0210935 A1 | 10/2004 | Schein et al. |
| 2003/0023440 | A1 | 1/2003 | Chu | 2004/0213271 A1 | 10/2004 | Lovy et al. |
| 2003/0028890 | A1 | 2/2003 | Swart et al. | 2004/0221302 A1 | 11/2004 | Ansari et al. |
| 2003/0033416 | A1 | 2/2003 | Schwartz | 2004/0223485 A1 | 11/2004 | Arellano et al. |
| 2003/0043915 | A1 | 3/2003 | Costa et al. | 2004/0226035 A1 | 11/2004 | Hauser, Jr. |
| 2003/0046091 | A1 | 3/2003 | Arneson et al. | 2004/0226045 A1 | 11/2004 | Nadarajah |
| 2003/0046689 | A1 | 3/2003 | Gaos | 2004/0239624 A1 | 12/2004 | Ramian |
| 2003/0056223 | A1 | 3/2003 | Costa et al. | 2004/0252119 A1 | 12/2004 | Hunleth et al. |
| 2003/0058277 | A1 | 3/2003 | Bowman-Amuah | 2004/0252120 A1 | 12/2004 | Hunleth et al. |
| 2003/0061611 | A1 | 3/2003 | Pendakur | 2004/0252769 A1 | 12/2004 | Costa et al. |
| 2003/0071792 | A1 | 4/2003 | Safadi | 2004/0252770 A1 | 12/2004 | Costa et al. |
| 2003/0093793 | A1 | 5/2003 | Gutta | 2004/0260407 A1 | 12/2004 | Wimsatt |
| 2003/0097661 | A1* | 5/2003 | Li et al. .................... 725/109 | 2004/0261116 A1 | 12/2004 | McKeown et al. |

| | | | |
|---|---|---|---|
| 2004/0267729 | A1 | 12/2004 | Swaminathan et al. |
| 2004/0268393 | A1 | 12/2004 | Hunleth et al. |
| 2005/0027851 | A1 | 2/2005 | McKeown et al. |
| 2005/0028208 | A1* | 2/2005 | Ellis et al. ............... 725/58 |
| 2005/0038814 | A1 | 2/2005 | Iyengar et al. |
| 2005/0044280 | A1 | 2/2005 | Reisman |
| 2005/0097612 | A1 | 5/2005 | Pearson et al. |
| 2005/0132295 | A1 | 6/2005 | Noll et al. |
| 2005/0195961 | A1 | 9/2005 | Pasquale et al. |
| 2005/0251827 | A1* | 11/2005 | Ellis et al. ............... 725/47 |
| 2005/0289618 | A1* | 12/2005 | Hardin ............... 725/95 |
| 2006/0031873 | A1* | 2/2006 | Fahrny et al. ............... 725/31 |
| 2006/0092323 | A1* | 5/2006 | Feeler et al. ............... 348/553 |
| 2006/0123455 | A1* | 6/2006 | Pai et al. ............... 725/133 |
| 2006/0197828 | A1* | 9/2006 | Zeng et al. ............... 348/14.13 |

FOREIGN PATENT DOCUMENTS

| | | |
|---|---|---|
| WO | WO 01/60066 A1 | 8/2001 |
| WO | WO 02/17627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/148,967, filed Jun. 9, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.
International Search Report and Written Opinion for International Application No. PCT/US06/01114, mailed Mar. 9, 2007.

* cited by examiner

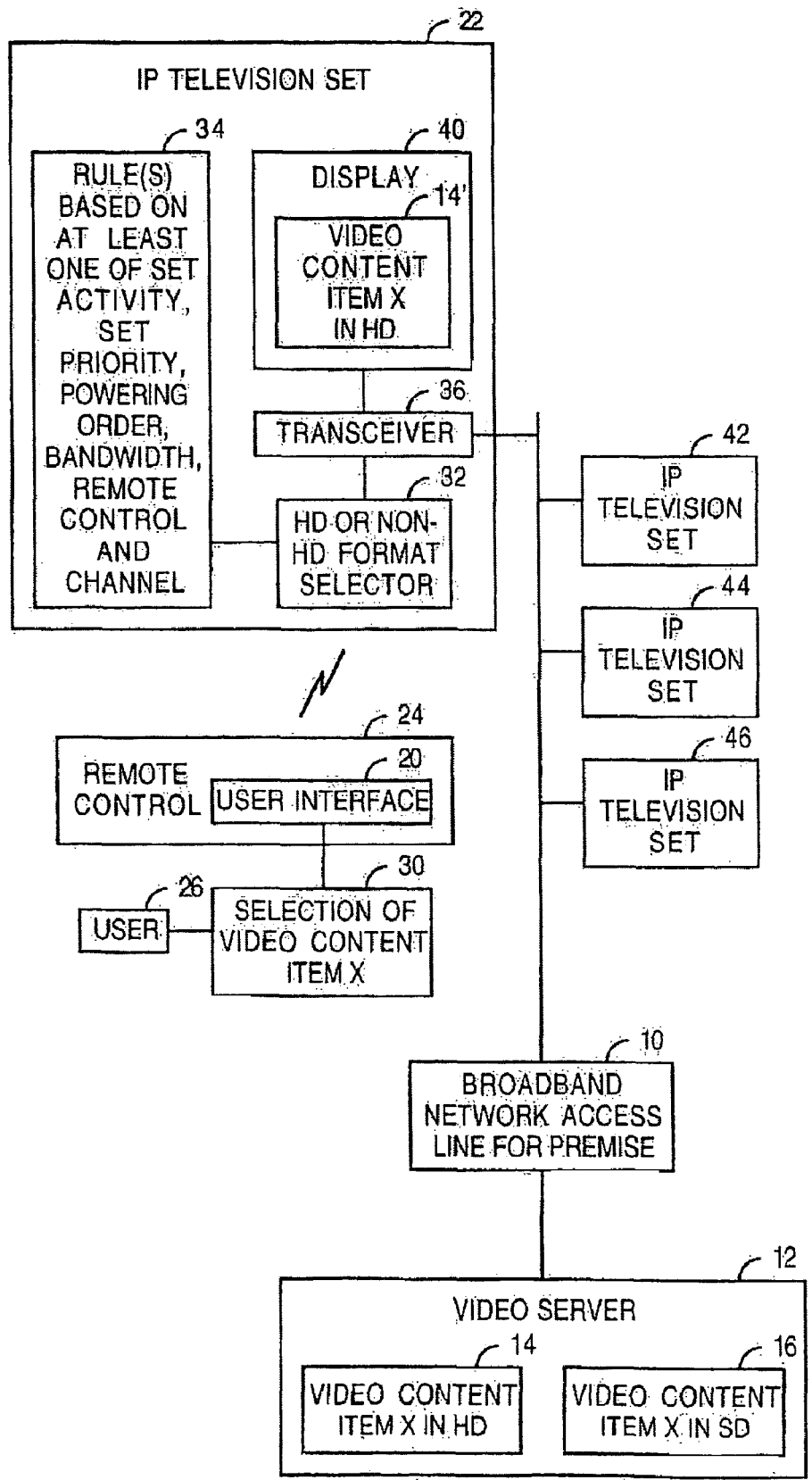

AUTOMATIC SWITCHING BETWEEN HIGH DEFINITION AND STANDARD DEFINITION IP TELEVISION SIGNALS

FIELD OF THE DISCLOSURE

The present disclosure relates to Internet Protocol television systems.

DESCRIPTION OF THE RELATED ART

Many televisions are cable-ready in that they can receive cable television signals carried on a coaxial cable and display programming based on the signals. These and other televisions typically require an additional device to handle television signals other than cable and terrestrial analog broadcast signals. The additional device, usually called a set-top box, decodes and translates alternative television signals into a format that can be received and displayed by the television. Examples of the alternative television signals include signals beamed from satellites, digitally encrypted signals communicated via a cable plant, and digitally encoded signals transmitted by terrestrial over-the-air television stations.

Set-top boxes have the following shortcomings associated with their use.

The operation of the television and the set-top box are substantially independent. Simple operations, such as turning the system on, can require multiple steps, multiple remote controls or specially-programmed remote controls.

The television needs to be tuned to a particular input to receive a signal outputted by a set-top box. The input can be a specific channel, such as channel 3 for example. Alternatively, the input can be a secondary input of a television, such as a video line input. Having multiple secondary inputs can create difficulties for users who are uncertain of how to switch between the inputs for various situations (e.g. for playing games, for displaying VCR playback, and for displaying DVD playback).

Setup complexity is high for some set-top boxes. Typically, the set-top boxes must be set up in specific ways to ensure that there are sufficient tuners assigned appropriately for supported televisions. Tuner and decoder sharing issues may result when set-top boxes attempt to share tuners across multiple televisions in a residence. Further, various cables between the set-top box and the television, and between the set-top box and a signal source, must be correctly connected so that the set-top box operates in its intended manner.

Setup and use of high definition signals typically requires special customer premises equipment and/or a special configuration of the set-top box if a user wants to switch back and forth between standard definition television and high definition television.

BRIEF DESCRIPTION OF THE DRAWING

The present invention is pointed out with particularity in the appended claims. However, other features are described in the following detailed description in conjunction with the accompanying drawing in which:

FIG. 1 is a block diagram of an embodiment of a system for automatically switching between high definition and non-high-definition Internet Protocol television signals.

DETAILED DESCRIPTION OF THE DRAWINGS

Disclosed herein are embodiments of a television set that does not require use of a set-top box to receive Internet Protocol (IP) television signals from a video server. The television set includes a format selector to automatically select between a high-definition (HD) format and a non-HD format of a user-selected video content item based on at least one rule. The television set retrieves the automatically-selected format of the video content item from the video server using an Internet Protocol, and decodes and displays the video content item.

FIG. 1 is a block diagram of an embodiment of a system for automatically switching between high definition and non-high-definition Internet Protocol television signals. The system is illustrated with reference to television sets at a single customer premise. The television sets can receive IP television content via a broadband network access line 10 to the customer premise. The IP television content is available from one or more video servers, such as a video server 12. Some video content items are available in multiple degrees of display definition. For example, the video server 12 may make available a video content item X both in an HD format 14 and a non-HD format 16. The non-HD format 16 may be a standard definition (SD) format, for example. In practice, the video server 12 makes available multiple video content items, at least some of which are available in both an HD format and a non-HD format.

A user interface 20 is to receive user selections of video content items to be retrieved, decoded and displayed by a television set 22. The user selections may be made by switching channels (e.g. by entering a channel number, incrementing or decrementing a channel number, or selecting a channel from a program guide displayed by the television set 22), or selecting a particular video content item from a menu (e.g. by ordering video-on-demand such as a movie-on-demand). The user interface 20 may be integrated with the television set 22 and/or may be part of a remote control 24. If the user selection is made using the remote control 24, the remote control 24 communicates the selection to the television set 22 via a signal such as an infrared signal or a radio frequency signal. For purposes of illustration and example, consider a user 26 using the user interface 20 to input a selection 30 of the video content item X, which is available in both the HD format 14 and the non-HD format 16.

The television set 22 includes a format selector 32 to automatically select which format of the video content item X, from the HD format 14 and the non-HD format 16, to retrieve via the broadband network access line 10. The format selector 32 automatically selects the format to retrieve based on at least one rule 34. Specific examples of the at least one rule 34 are given later in this detailed description.

The format selector 32 is beneficial where a service provider limits a number of HD video content items that can be simultaneously supplied into the customer premise via the broadband network access line 10. For example, the service provider may enable only one HD channel at a time via the broadband network access line 10. As another example, the service provider may enable at most two different HD channels at a time via the broadband network access line 10.

The television set 22 translates the user selection and the automatically-selected format into a request to control the television service. In one embodiment, the request is a hypertext transfer protocol (HTTP) request. The request is transmitted by a transceiver 36. The television set 22 has one or more physical connectors to enable a direct connection of the transceiver 36 to either the broadband network access line 10 or to a home network that shares access to the broadband network access line 10. Examples of the physical connectors include, but are not limited to, a coaxial cable connector, an Ethernet connector such as a Category-6 connector, and a telephone line connector such as a Category-3 or Category-5 connector.

The request is communicated via the broadband network access line 10 and a computer network to the video server 12. The video server 12, in turn, retrieves the user-selected video content item in the format automatically selected by the format selector 32, and serves the same to the television set 22 via the computer network and the broadband network access line 10. The transceiver 36 includes a receiver to receive the video content item via the broadband network access line 10 in the format automatically selected by the format selector 32.

The television set 22 has one or more decoders to directly decode IP-based video content. The decoder(s) are used to decode the received video content item in the automatically-selected format. The decoder(s) may be flash upgradeable by either a manufacturer of the television set 22 or a service provider to ensure that latest codecs are implemented on the television set 22. Optionally, the television set 22 includes a memory media slot to receive a memory card having decoder and user interface software. This optional feature allows a television manufacturer or a content provider to supply enhanced decoders separately from the television set 22 itself. Security measures, if required by a content provider, can be enabled using a smart card installed into the television set 22.

For purposes of illustration and example, consider the format selector 32 selecting the HD format 14 based on the at least one rule 34. The transceiver 36 sends a request message to the video server 12 for the selected video content item in the HD format 14. The request message is communicated via the broadband network access line 10 and the computer network to the video server 12. Based on the request message, the video server 12 retrieves and serves the video content item in the HD format 14 to the television set 22 via the computer network and the broadband network access line 10. The television set 22 receives and decodes the video content item in the HD format 14. A television display 40 displays the decoded video content item in the HD format 14'.

In one embodiment, the television set 22 communicates with the video server 12 using standard IP protocols to perform acts such as switching channels, ordering movies on demand, and bringing up a channel guide. For example, communication between the television set 22 and the video server 12 and any other servers associated with an IP television service can use the HTTP protocol and HTML markup language. The television set 22 may act as a Web browser, however in normal operation would only access specially-designed IP television Web pages that are designed to be well-displayed on a television display.

In general, the at least one rule 34 for automatic format selection is based on at least one of: a state of the television set 22, a particular channel associated with the video content item, a state of the remote control 24, a state of at least one other television set (e.g. television sets 42, 44 and 46) that receive video content via the broadband network access line 10, a state of the broadband network access line 10, and an availability of multiple formats of the video content item from the video server 12. The at least one rule 34 may include rule(s) pre-programmed by a manufacturer and/or a content provider, and/or rule(s) programmed by the user 26.

Specific examples of the at least one rule 34 are as follows. The at least one rule 34 may comprise a rule to select the HD format if the television display 40 is a most-recently-powered-on television display of one or more television displays that are receiving video content via the broadband network access line 10. Under this rule, the HD format is automatically selected if the television display 40 was powered-up more recently than displays of the television sets 42, 44 and 46.

The at least one rule 34 may comprise a rule to select the HD format if the television display 40 is a most-recently-active television display of one or more television displays that are receiving video content via the broadband network access line 10. Under this rule, the HD format is automatically selected if user activity associated with the television display 40 (e.g. based on use of the user interface 20) is more recent than user activity associated with the television sets 42, 44 and 46.

The at least one rule 34 may comprise a rule to select the HD format based on a priority of the television set 22 relative to at least one other television set that is receiving video content via the broadband network access line 10. Under this rule, the HD format is automatically selected if the television set 22 has a higher priority than any of the television sets 42, 44 or 46 that are also receiving video content via the broadband network access line 10. For example, consider the television set 42 having the highest priority and the television set 22 having the second highest priority at the customer premise. If television set 42 is not receiving video content via the broadband network access line 10, then the television set 22 (being highest in priority) will automatically select the HD format, if available. If the television set 42 is receiving video content via the broadband network access line 10, then the television set 22 (being second highest in priority) may automatically select the SD format.

The at least one rule 34 may comprise a rule to select the HD format if an unused bandwidth (i.e. an available bandwidth) of the broadband network access line 10 is greater than a threshold. Under this rule, the HD format is automatically selected if a suitable amount of unused bandwidth (e.g. bandwidth not being used by the television sets 42, 44 and 46, and other devices that use the broadband network access line 10) is available for HD.

The at least one rule 34 may comprise a rule to select the HD format if the user interface 20 is part of a particular remote control having HD priority. For example, if the broadband network access line 10 is intended to carry at most one HD signal, the customer premise may have one remote control whose use enables HD priority. As another example, if the broadband network access line 10 is intended to carry at most two HD signals, the customer premise may have two remote controls whose use enable HD priority. The HD-priority remote control(s) may be carried from room-to-room in the customer premise to control each of the television sets 22, 42, 44 and 46.

The at least one rule 34 may comprise a rule to select the HD format for one or more specified channels, and to select the non-HD format for other channels. Alternatively, the at least one rule 34 may comprise a rule to select the non-HD format for one or more specified channels, and to select the HD format for other channels. In either case, the one or more specified channels may be specified by the television manufacturer, the content provider, and/or the user 26.

Other rules include, but are not limited to, always selecting the HD format for a particular television set, always selecting the non-HD format for a particular television set, and always looking for and providing an HD format of a video content item even if the user has selected an SD format of the video content item.

The at least one rule 34 may include any combination of the above rule examples. If the none of the rule(s) 34 permit the HD format to be selected, then the format selector 32 selects the non-HD format (e.g. a standard definition format).

As an alternative or in addition to automatic format selection by the television set 22, the format may be manually selected by the user 26 using the user interface 20. For example, the user 26 may be queried if multiple definition types exist for a particular video content item. The user 26 would use the user interface 20 to select one of the multiple definition types. If a parental control is active, the selection of HD may require an input of a parental access code.

The format selector 32 and other components of the television set 22 can be implemented by at least one computer processor. Acts performed by the at least one computer processor are directed by a computer-readable medium having computer-readable program code stored therein. The at least one rule 34 may be stored by the computer-readable medium.

Embodiments of the television set 22 are designed to handle both standard definition and high definition signals out of the box. The switching between the two is automatic, programmable, and/or manual. Users who have IP television service can simply plug in a cable from a wall to the television set 22 to begin to use the service. No setup, no additional cabling, and no extra equipment (e.g. no set top box, no converter and no extra remote control) is required for basic operation. This reduces an operational cost of fielding a basic IP TV service, and eases its usability burden.

Additional capabilities such as digital video recording (DVR) or advanced functions such as photo or music management can be implemented separately in a thin set-top box. DVRs and other advanced functions may be implemented on servers in the network. With a high bandwidth connection between the television set and the servers, advanced functions can be delivered cost effectively since no incremental hardware cost is required for the television set.

It will be apparent to those skilled in the art that the disclosed embodiments may be modified in numerous ways and may assume many embodiments other than the forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An Internet Protocol television set comprising:
   a format selector within the Internet Protocol television set configured to perform an automatic selection of an Internet Protocol television signal corresponding to a format of a selected video content item, wherein the automatic selection of the Internet Protocol television signal is based on at least one rule, is performed before the Internet Protocol television signal is received by the Internet Protocol television set, and is chosen from one of a high definition Internet Protocol television signal that corresponds to a high definition format and a non-high definition Internet Protocol television signal that corresponds a non-high definition format;
   a transceiver within the Internet Protocol television set configured to transmit a request from the Internet Protocol television set to a video server over a broadband network access line, wherein the request is a request to retrieve the selected video content item according to the Internet Protocol television signal that is automatically selected by the format selector;
   a receiver within the Internet Protocol television set, the receiver to receive the Internet Protocol television signal that is automatically selected by the format selector, wherein the Internet Protocol television signal is directly received via the broadband network access line;
   a memory media slot within the Internet Protocol television set, the memory media slot to receive a memory card that stores one or more decoders to decode the Internet Protocol television signal to produce the selected video content item according to the format corresponding to the Internet Protocol television signal, wherein the Internet Protocol television signal is decodable when the memory card is inserted into the memory media slot, and wherein the Internet Protocol television signal is not decodable when the memory card is removed from the memory media slot; and
   a television display within the Internet Protocol television set, the television display to display the selected video content item according to the format corresponding to the Internet Protocol television signal in response to the one or more decoders decoding the Internet Protocol television signal.

2. The Internet Protocol television set of claim 1, wherein the at least one rule comprises a rule to automatically select the high definition Internet Protocol television signal when the television display is powered on before one or more television displays of other Internet Protocol television sets that are receiving video content via the broadband network access line.

3. The Internet Protocol television set of claim 1, wherein the at least one rule comprises a rule to automatically select the high definition Internet Protocol television signal when the television display is active before one or more television displays of other Internet Protocol television sets that are receiving video content via the broadband network access line.

4. The Internet Protocol television set of claim 1, wherein the at least one rule comprises a rule to automatically select the high definition Internet Protocol television signal when an unused bandwidth of the broadband network access line is greater than a threshold.

5. The Internet Protocol television set of claim 1, wherein the at least one rule comprises a rule to automatically select the high definition Internet Protocol television signal if the selected video content item is requested via a remote control that has priority for high definition format of video content over one or more other remote controls for the selected video content item, wherein the remote control and the other remote controls are associated with the Internet Protocol television set.

6. The Internet Protocol television set of claim 1, wherein the at least one rule comprises a rule to automatically select the high definition Internet Protocol television signal for one or more specified channels, and to automatically select the non-high definition Internet Protocol television signal for other channels, wherein the one or more specified channels are determined by one of a manufacturer of the Internet Protocol television set, a content provider, and a user of the Internet Protocol television set.

7. The Internet Protocol television set of claim 1, wherein the at least one rule comprises a rule to automatically select the non-high definition Internet Protocol television signal when a second video content item in a high definition format is simultaneously being received at a customer premise of the Internet Protocol television set via the broadband network access line.

8. The Internet Protocol television set of claim 1, wherein the at least one rule comprises a rule to automatically select the high definition Internet Protocol television signal when the Internet Protocol television set has a higher priority than a second Internet Protocol television set that is currently receiving content in the high definition format.

9. The Internet Protocol television set of claim 1, wherein at least one of the one or more decoders stored at the memory card is supplied by one of a content provider and a manufacturer of the Internet Protocol television set.

10. The Internet Protocol television set of claim 1, wherein the one or more decoders stored at the memory card are flash upgradable by at least one of a manufacturer of the Internet Protocol television set and a service provider.

11. The Internet Protocol television set of claim 1, further comprising a processor configured to be coupled to a computer-readable medium having instructions executable by the processor to access the at least one rule that is stored on the computer-readable medium.

12. The Internet Protocol television set of claim 11, wherein the at least one rule is programmed and stored on the computer-readable medium by one of a content provider, a manufacturer of the Internet Protocol television set, and a provider of the selected video content item.

13. The Internet Protocol television set of claim 11, wherein the at least one rule is programmed and stored on the computer-readable medium by a user of the Internet Protocol television set.

14. A method comprising:
  receiving a user selection of a video content item at an Internet Protocol television set, the video content item being available in a high definition format and a non-high definition format via a broadband network access line;
  performing an automatic selection, using a format selector within the Internet Protocol television set, of an Internet Protocol television signal corresponding to a format of the video content item, wherein the automatic selection of the Internet Protocol television signal is based on at least one rule, is performed before the Internet Protocol television signal is received by, the Internet Protocol television set, and is chosen from one of a high definition Internet Protocol television signal that corresponds to the high definition format and a non-high definition Internet Protocol television signal that corresponds the non-high definition format;
  transmitting a request from the Internet Protocol television set to a video server over the broadband network access line, wherein the request is a request to retrieve the video content item according to the Internet Protocol television signal that is automatically selected by the format selector;
  receiving the Internet Protocol television signal automatically selected by the format selector directly from the video server via the broadband network access line;
  decoding the Internet Protocol television signal to produce the video content item according to the format corresponding to the Internet Protocol television signal using one or more decoders stored at a memory card that is inserted into a memory media slot of the Internet Protocol television set, wherein the Internet Protocol television signal is not decodable when the memory card is removed from the memory media slot; and
  displaying, at a television display within the Internet Protocol television set, the video content item according to the format corresponding to the Internet Protocol television signal in response to the one or more decoders decoding the Internet Protocol television signal.

15. The method of claim 14, wherein the user selection of the video content item is received at the Internet Protocol television set via a user interface that is integrated with the Internet Protocol television set.

16. The method of claim 14, wherein the user selection of the video content item is received at the Internet Protocol television set via a signal from a first remote control of a plurality of remote controls associated with the Internet Protocol television set.

17. The method of claim 16, wherein the at least one rule comprises a rule to automatically select the high definition Internet Protocol television signal in response to the signal from the first remote control, wherein the first remote control has priority over other remote controls of the plurality of remote controls for the high definition format of the video content item.

18. The method of claim 17, wherein a second remote control of the other remote controls has priority over the other remote controls for the high definition format of the video content item, wherein the at least one rule further comprises a rule to automatically select the high definition Internet Protocol television signal in response to receiving a signal at the Internet Protocol television set from the second remote control.

19. The method of claim 14, wherein the request transmitted from the Internet Protocol television set to the video server includes a hypertext transfer protocol request.

* * * * *